(12) United States Patent
Ikai et al.

(10) Patent No.: US 10,579,044 B2
(45) Date of Patent: Mar. 3, 2020

(54) COMPUTER READABLE INFORMATION RECORDING MEDIUM, EVALUATION METHOD, AND CONTROL DEVICE

(71) Applicant: FANUC CORPORATION, Minamitsuru-gun, Yamanashi (JP)

(72) Inventors: Satoshi Ikai, Yamanashi (JP); Kenichi Takayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 16/006,221

(22) Filed: Jun. 12, 2018

(65) Prior Publication Data

US 2018/0364678 A1   Dec. 20, 2018

(30) Foreign Application Priority Data

Jun. 15, 2017   (JP) .................... 2017-117592

(51) Int. Cl.
  *G05B 19/408*   (2006.01)
  *G05B 19/404*   (2006.01)

(52) U.S. Cl.
  CPC ....... *G05B 19/4083* (2013.01); *G05B 19/404* (2013.01); *G05B 2219/31103* (2013.01); *G05B 2219/33032* (2013.01); *G05B 2219/33099* (2013.01); *G05B 2219/33321* (2013.01); *G05B 2219/43196* (2013.01)

(58) Field of Classification Search
  None
  See application file for complete search history.

(56) References Cited

U.S. PATENT DOCUMENTS 6,034,498 A * 3/2000 Hamamura .......... G05B 19/404
                                               318/632
2012/0283851 A1* 11/2012 Yamamoto ............. G05B 19/19
                                               700/56

FOREIGN PATENT DOCUMENTS

| JP | 11-024754  | 1/1999 |
| JP | 2010-99824 | 5/2010 |
| JP | 2011-134169| 7/2011 |
| JP | 2012-58824 | 3/2012 |

OTHER PUBLICATIONS

Notification of Reasons for Refusal dated Mar. 5, 2019 in corresponding Japanese Patent Application No. 2017-117592.

* cited by examiner

*Primary Examiner* — Sean Shechtman
(74) *Attorney, Agent, or Firm* — Wenderoth, Lind & Ponack, L.L.P.

(57) ABSTRACT

A non-transitory computer readable information recording medium stores an evaluation program for operating first and second motor control units, for evaluating operation characteristics related to a control device including a first motor control unit configured to control a first motor driving a first axis, and a second motor control unit configured to control a second motor driving a second axis. The evaluation program operates the first and second motor control units so that a shape of a movement path of a control target moved by the first and second axes includes at least a cornered shape in which both rotation directions of the first and second motors do not invert, and an arc shape in which one of the first and second motors rotates in one direction, and a rotation direction of the other of the first and second motors inverts.

2 Claims, 7 Drawing Sheets

COMPUTER READABLE INFORMATION RECORDING MEDIUM, EVALUATION METHOD, AND CONTROL DEVICE

This application is based on and claims the benefit of priority from Japanese Patent Application No. 2017-117592, filed on 15 Jun. 2017, the content of which is incorporated herein by reference.

BACKGROUND OF THE INVENTION

Field of the Invention

The present invention relates to a non-transitory computer readable information recording medium used in a control device that controls a motor driving at least two or more axes, an evaluation method, and the control device.

Related Art

Patent Document 1 discloses learning control (repeating control) as a method of realizing followability of high speed and high accuracy with respect to a command in which the same geometry pattern is repeated in a predetermined cycle, in control of a motor. Particularly, Patent Document 1 discloses a control system that machines a geometry formed of an arc, a polygon, or combination thereof by coordinated operation of a plurality of axes including two axes that are orthogonal to each other. This control system operates a positional deviation between a position command and position feedback of a detected servo motor, for every sampling cycle, calculates a reference signal changing in one direction, from the position command or the position feedback of own axis or another axis, and performs learning control on the basis of the reference signal, the position command, and the positional deviation.

Patent Document 2 discloses a method of improving machine accuracy in multi-machining of a reentrant corner portion by a wire electrical discharge machine. Particularly, Patent Document 2 discloses a control device of a wire electrical discharge machine and a machining path creation device having: a machining program storage means of storing a machining program; an offset value storage means of storing a wire offset value for every machining time; a machining program analysis means of analyzing the machining program; a geometry creation means of creating a geometry of a workpiece on the basis of an analysis result by the machining program analysis means; an arc radius for geometry compensation storage means of storing an arc radius predetermined for performing compensation of the geometry; and an arc shape insertion means of, when a shape created by the geometry creation means is a geometry having a reentrant corner portion formed by crossing of two linear movement blocks that are parallel with each other, deleting each one portion in the reentrant corner side, and inserting an arc-shaped movement block having the arc radius to the deleted portion.

Patent Document 1: Japanese Unexamined Patent Application, Publication No. 2012-58824
Patent Document 2: Japanese Unexamined Patent Application, Publication No. 2010-099824

SUMMARY OF THE INVENTION

It is desirable that a control parameter of a motor control unit that controls a motor in a machine tool, a robot, or an industrial machine is adjusted by operating the motor control unit by using a machining program executed actually or an operation control program. However, the machining program to be actually executed or the operation control program are changed depending on a workpiece or operation. Thus, it is desirable that the motor control unit is operated by using an evaluation program separately from the machining program or the operation control program to control the motor, and the control parameter of the motor control unit is adjusted on the basis of a result of the control.

An object of the present invention is to provide a non-transitory computer readable information recording medium in which an evaluation program for adjusting a control parameter of a motor control unit is recorded, an evaluation method using the evaluation program, and a control device.

(1) A non-transitory computer readable information recording medium according to the present invention is a non-transitory computer readable information recording medium that stores an evaluation program for operating first and second motor control units, for evaluating operation characteristics related to a control device including the first motor control unit (for example, a motor control unit 103 described later) configured to control a first motor (for example, a motor 201 described later) driving a first axis of a machine tool, a robot, or an industrial machine, and the second motor control unit (for example, a motor control unit 104 described later) configured to control a second motor (for example, a motor 202 described later) driving a second axis of a different direction from the first axis,
the evaluation program causing a computer to execute processing of operating the first and second motor control units so that a shape of a movement path of a control target moved by the first and second axes driven by the first and second motors includes at least a cornered shape in which both rotation directions of the first and second motors do not invert, and an arc shape in which one of the first and second motors rotates in one direction, and a rotation direction of the other of the first and second motors inverts.

(2) In the non-transitory computer readable information recording medium of (1) described above, the shape of the movement path of the control target moved by the first and second axes driven by the first and second motors may further include a cornered shape in which one of the first and second motors decelerates and then stops, and the other of the first and second motors rotates from a stop state.

(3) A non-transitory computer readable information recording medium according to the present invention is a non-transitory computer readable information recording medium that stores an evaluation program for operating first and second motor control units, for evaluating operation characteristics related to a control device including the first motor control unit (for example, a motor control unit 103 described later) configured to control a first motor (for example, a motor 201 described later) driving a first axis of a machine tool, a robot, or an industrial machine, and the second motor control unit (for example, a motor control unit 104 described later) configured to control a second motor (for example, a motor 202 described later) driving a second axis of a different direction from the first axis,
the evaluation program causing a computer to execute processing of operating the first and second motor control units so that a shape of a movement path of a control target moved by the first and second axes driven by the first and second motors includes a cornered shape in which both rotation directions of the first and second motors invert.

(4) A non-transitory computer readable information recording medium according to the present invention is a non-transitory computer readable information recording medium that stores an evaluation program for operating first and second motor control units, for evaluating operation characteristics related to a control device including the first motor control unit (for example, a motor control unit 103 described later) configured to control a first motor (for example, a motor 201 described later) driving a first axis of a machine tool, a robot, or an industrial machine, and the second motor control unit (for example, a motor control unit 104 described later) configured to control a second motor (for example, a motor 202 described later) driving a second axis of a different direction from the first axis, the evaluation program causing a computer to execute processing of operating the first and second motor control units so that a shape of a movement path of a control target moved by the first and second axes driven by the first and second motors is a shape in which a movement direction of from when at least one of the first and second axes stops to when the axis stops next time, and a movement direction from when the axis stops next time are the same direction.

(5) In the non-transitory computer readable information recording medium of (1) described above, the shape of the movement path may be an octagon in which the cornered shape and the arc shape are alternately arranged.

(6) In the non-transitory computer readable information recording medium of (2) described above, the shape of the movement path may be a cross shape having a half of an octagon in which the cornered shape and the arc shape are alternately arranged, in an end portion.

(7) In the non-transitory computer readable information recording medium of (3) described above, the shape of the movement path may be a star shape having the cornered shape in each end portion.

(8) In the non-transitory computer readable information recording medium of (4) described above, the shape of the movement path may be a shape drawing a cross shape by an arc, or a cross shape including corners composed of a convex arc and a concave arc.

(9) An evaluation method according to the present invention is an evaluation method of evaluating at least one operation characteristic of compensation of backlash by inversion, compensation of static friction, and feedforward, in the first and second motor control units, by driving the first and second motors by the first and second motor control units, respectively, of the control device by using the evaluation program recorded in the non-transitory computer readable information recording medium according to any one of (1) to (8) described above.

(10) A control device according to the present invention is a control device that includes a storage unit (for example, a storage unit 101 described later) that stores the evaluation program recorded in the non-transitory computer readable information recording medium according to any one of (1) to (8) described above, and a numerical control information processing unit (for example, a numerical control information processing unit 102 described later) configured to output a position command to each of the first and second motor control units on the basis of the evaluation program.

According to the present invention, a non-transitory computer readable information recording medium recorded with an evaluation program capable of controlling a motor by operating a motor control unit related to a machine tool, a robot, or an industrial machine, to efficiently adjust a control parameter, and the like of the motor control unit on the basis of a result of the control, an evaluation method, and a control device can be provided.

DETAILED DESCRIPTION OF THE INVENTION

Embodiments of the present invention will be described in detail below with reference to drawings. In the present embodiment, a case where an evaluation program according to the present invention is operated by a CNC device that is a control device, and thereby, a control parameter related to feedforward control in the CNC device is adjusted (learned) is described as an example. More particularly, in the present embodiment, operation characteristics of the CNC device for evaluating the control parameter is observed by operating the evaluation program according to the present invention by the CNC device after an arbitrary value is set to the control parameter related to the feedforward control in the CNC device. Thereby, a control parameter value is arbitrary set, and the operation characteristics of the CNC device observed on the basis of each control parameter value is evaluated. As a result, the control parameter value of when an optimal operation characteristic of a machine tool is observed, can be adjusted (learned) as an optimal control parameter value.

Figure 1:
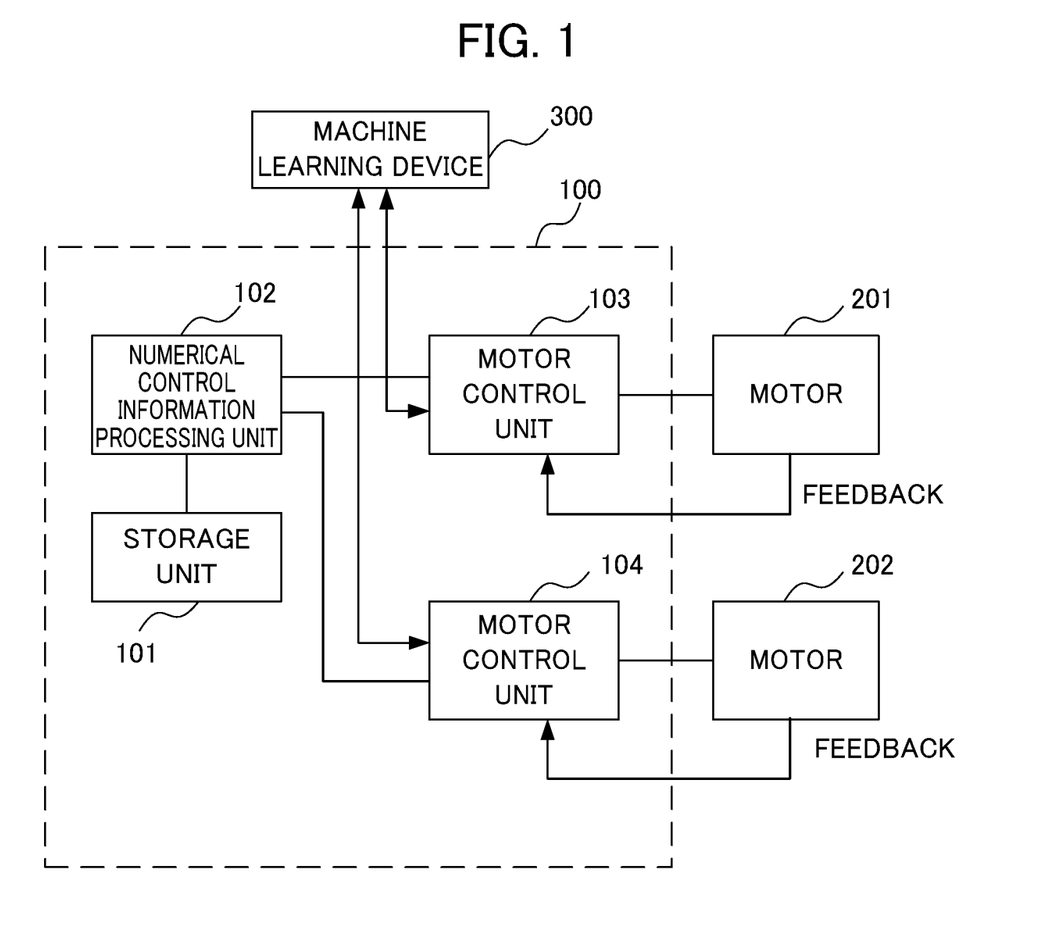
FIG. 1 is a block diagram showing a configuration of a CNC device operated by an evaluation program according to an embodiment of the present invention, a machine learning device, and a motor.

Before the evaluation program is described, a configuration of a system including the CNC device operated by the evaluation program is briefly described. FIG. 1 is a block diagram showing a configuration of the CNC device operated by the evaluation program according to an embodiment of the present invention, a machine learning device, and a motor. A computerized numerical control (CNC) device 100 includes a storage unit 101, a numerical control information processing unit 102, and motor control units 103, 104 composing a servo control device. The CNC device serves as a control device. Motor control units 103, 104 control motors 201, 202. The CNC device 100 is used in a machine tool, a robot, an industrial machine, and the like. Here, a case where the CNC device 100 is used in a machine tool is described as an example. The storage unit 101 and the numerical control information processing unit 102 compose a computer.

The storage unit 101 stores an evaluation program. This evaluation program is a machining program used in the CNC device 100 at the time of evaluation. The evaluation program is provided separately from the machining program used at the time of machining such as actual cutting processing. The evaluation program performs evaluation while machining a workpiece, and may perform evaluation also including a case of air cutting.

The numerical control information processing unit 102 reads the evaluation program from the storage unit 101 to execute the evaluation program. Thereby, the numerical control information processing unit 102 creates position command values of X axis and Y axis on the basis of a code included in the evaluation program, to output the position command values to the motor control units 103, 104. The numerical control information processing unit 102 sets a moving distance of an axis direction, a feedrate, and the like, to create the position command values of the X axis and the Y axis, so that the geometry becomes the one specified by the evaluation program.

The motor control unit 103 creates a current command value (torque command value) on the basis of the position command value of the X axis, and a position detection value obtained by feedback from the motor 201, to output the current command value to the motor 201. The motor control unit 104 creates a current command value (torque command value) on the basis of the position command value of the Y axis, and a position detection value obtained by feedback from the motor 202, to output the current command value to the motor 202.

The motors 201, 202 drive a table on which a workpiece is mounted when the device is used in a machine tool, to the X axis direction and the Y axis direction, respectively. Each of the motors 201, 202 is connected to a ball screw. Two ball screws connected to the motors 201, 202 change rotation motion of the motors 201, 202 to linear motion, to drive the table in the X axis direction and the Y axis direction. A case where axes to be controlled are two of the X axis and the Y axis is described. When axes to be controlled are three or more axes, motors of the number corresponding to the number of the axes are provided. The number of the motor control units are provided correspondingly to the number of motors. As the motors 201, 202, for example, a servo motor or a spindle motor may be used.

Rotation angle positions of the motors 201, 202 are detected by a rotary encoder serving as a position detection unit associated with the motors 201, 202, and the detected signal is utilized as velocity detection values obtained by velocity feedback. The velocity detection value is integrated and utilized as the position detection value with which position feedback is performed.

Figure 2:
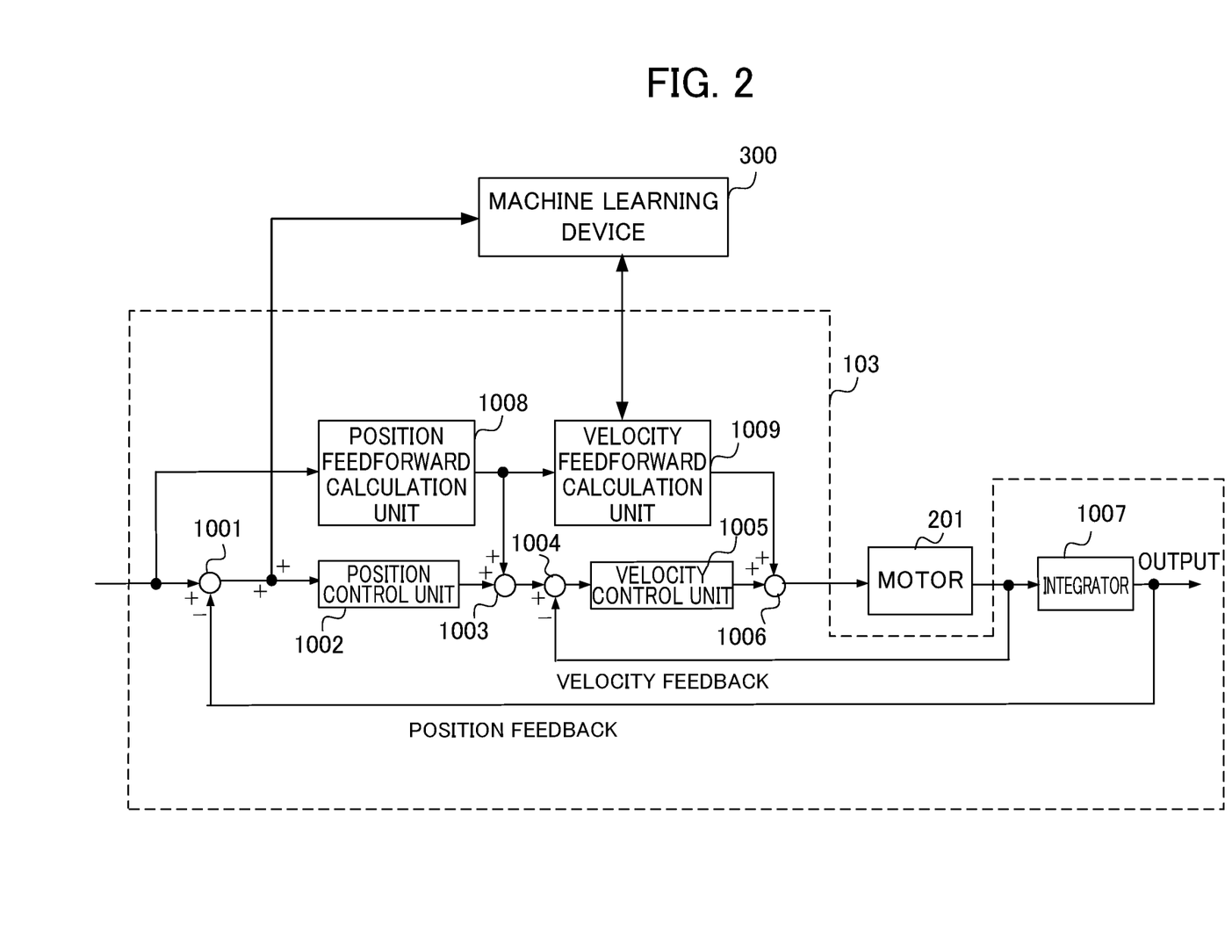
FIG. 2 is a block diagram showing a configuration example of a motor control unit.

Particular configuration of the motor control units 103, 104 is described. In the description below, the motor control unit 103 is described. The motor control unit 104 includes similar configuration. FIG. 2 is a block diagram showing a configuration example of the motor control unit 103. As shown in FIG. 2, the motor control unit 103 includes a subtractor 1001, a position control unit 1002, an adder 1003, a subtractor 1004, a velocity control unit 1005, an adder 1006, an integrator 1007, a position feedforward calculation unit 1008, and a velocity feedforward calculation unit 1009.

The numerical control information processing unit 102 creates a position command value on the basis of a code included in the evaluation program, to output the position command value to the subtractor 1001 and the position feedforward calculation unit 1008. The subtractor 1001 determines a difference between the position command value and the position detection value with which the position feedback has been performed, to output the difference to the position control unit 1002 as positional deviation. At the time of evaluation, the subtractor 1001 outputs the positional deviation also to a machine learning device 300. When the machining program operates after the evaluation in which the evaluation program operates, the subtractor 1001 does not output the positional deviation to the machine learning device 300.

The position control unit 1002 outputs to the adder 1003 a value obtained by multiplying a position gain Kp to the positional deviation, as a velocity command value. The position feedforward calculation unit 1008 outputs to the adder 1003, and the velocity feedforward calculation unit 1009, a value obtained by differentiating the position command value and multiplying a feedforward coefficient.

The adder 1003 adds the velocity command value, and an output value of the position feedforward calculation unit 1008, to output to the subtractor 1004, the obtained value as a feedforward controlled velocity command value. The subtractor 1004 determines difference between an output of the adder 1003, and the velocity detection value obtained by velocity feedback, to output the difference as velocity deviation, to the velocity control unit 1005.

The velocity control unit 1005 adds a value obtained by multiplying an integral gain K1v to the velocity deviation and multiplying, with a value obtained by multiplying a proportional gain K2v to the velocity deviation, to output obtained value as a torque command value, to the adder 1006.

The velocity feedforward calculation unit 1009, for example, performs velocity feedforward calculation processing represented by a transfer function Gf(s) represented by formula 1 (shown as Math. 1 below), to output obtained value to the adder 1006.

$$Gf(s) = \frac{b_0 + b_1 s + b_2 s^2 + \ldots}{a_0 + a_1 s + a_2 s^2 + \ldots} \qquad [\text{Math. 1}]$$

The adder 1006 adds the torque command value to the output value of the velocity feedforward calculation unit 1009, and outputs the sum to the motor 201 as a current command value (torque command value).

A rotation angle position of the motor 201 is detected by a rotary encoder serving as a position detection unit associated with the motor 201, and a detected signal is utilized as a velocity detection value with which velocity feedback is performed. The velocity detection value is integrated in the integrator 1007, to be utilized as a position detection value with which position feedback is performed.

In the present embodiment, a dimension of the transfer function Gf(s) is set to be a value set in advance, each of the coefficients $a_i$, $b_j$ (i, j≥0) is set to be an arbitrary value, then the evaluation program is operated in the CNC device 100, and thereby, operation characteristics of the CNC device related to control parameters $a_i$, $b_j$ is observed. Thereby, the machine learning device 300 can adjust (learn) the coefficients $a_i$, $b_j$ with which operation characteristics of a machine tool of when the machine tool is operated by the evaluation program are optimal, from among a set of coefficients $a_i$, $b_j$ that have been set to arbitrary values. Thus, the machine learning device 300 uses the position detection value, and the like obtained by feedback from the motors 201, 202, to learn the control parameters $a_i$, $b_j$ for feedforward compensation, and set the optimal control parameters with respect to the motor control units 103, 104.

More particularly, the machine learning device 300 observes state information s including a servo state such as a command and feedback, including positional deviation information as operation characteristics of the CNC device 100 obtained by executing the evaluation program, on the basis of the control parameters $a_i$, $b_j$ (i, j≥0). The machine learning device 300 performs adjustment (action a) of the parameters $a_i$, $b_j$ related to the state information s. When the state information s is corrected to state information s' by action information a, the machine learning device 300 sets a value of a reward r to be a negative value when a value of the positional deviation of the CNC device 100 operated on the basis of the control parameters $a_i'$, $b_j'$ after the correction related to the state information s' is larger than a value of the positional deviation of the CNC device 100 operated on the basis of the control parameters $a_i$, $b_j$ before the correction related to the state information s before the correction by the action information a. On the other hand, the machine learning device 300 sets the value of the reward r to be a positive value when the value of the positional deviation of the CNC device 100 operated on the basis of the control parameters $a_i'$, $b_j'$ after the correction related to the state information s' corrected by the action information a is smaller than a value of the positional deviation of the CNC device 100 operated on the basis of the control parameters $a_i$, $b_j$ before the correction related to the state information s before the correction by the action information a.

The machine learning device 300 searches by trial and error the optimal action a with which the total reward r for the future becomes the maximum. Thereby, the machine learning device 300 can select the optimal action a (that is, the optimal control parameters $a_i$, $b_j$) with respect to the state s including the servo state such as the command and feedback, including the positional deviation information of the CNC device 100 obtained by executing the evaluation program, on the basis of the control parameters $a_i$, $b_j$. Machine learning will be described in a supplement described later.

<Evaluation Program>

Next, the evaluation program is described. In the machine tool, for example, the motors 201 and 202 drive the table on which the workpiece is mounted in the X axis direction and the Y axis direction, respectively, and the workpiece is machined by a machining tool, laser beam, or the like. The evaluation program specifies the moving distance, the feedrate, and the like of the X axis direction and the Y axis direction in accordance with the geometry at the time of evaluation. When the machine learning device 300 adjusts (learns) the control parameters $a_i$, $b_j$, the machine learning device 300 cannot adjust the parameters on the basis of operation of all machining programs. Thus, the CNC device 100 uses shapes of, for example, an arc, a square, and a square with R so that representative operation, for example, inversed operation of the motor, inversed operation from stop of the motor, inversed operation from movement of the first axis related to the first motor to stop, and inversed operation from stop of the second axis related to the second motor, is performed. The square with R refers to a square having arc-shaped corners.

Figure 3:
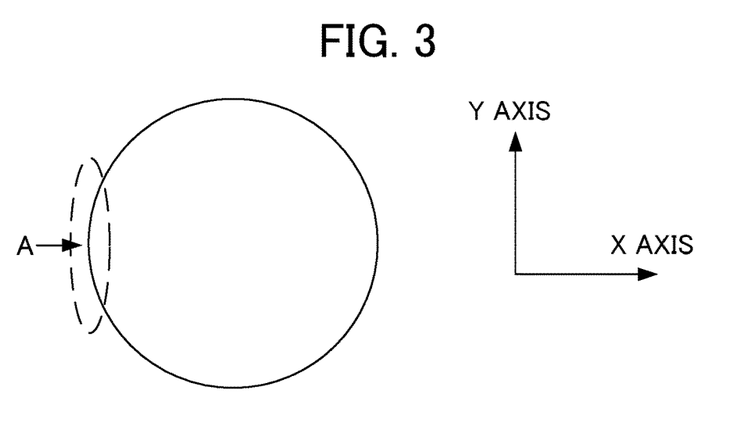
FIG. 3 is an explanation diagram showing an example in which a geometry is formed of an arc (circle).

When the geometry is an arc (circle), for example, in A point shown in FIG. 3, the rotation direction of the motor 201 that moves the table in the X axis direction inverts, and the table moves so as to linearly invert in the X axis direction. When the rotation direction of the motor 201 that moves the table in the X axis direction attempts to invert in the A point, inversion delay occurs, a path error extends in a radial direction, and when extension display of the path error is performed, the path error is seen as a projection.

Figure 4:
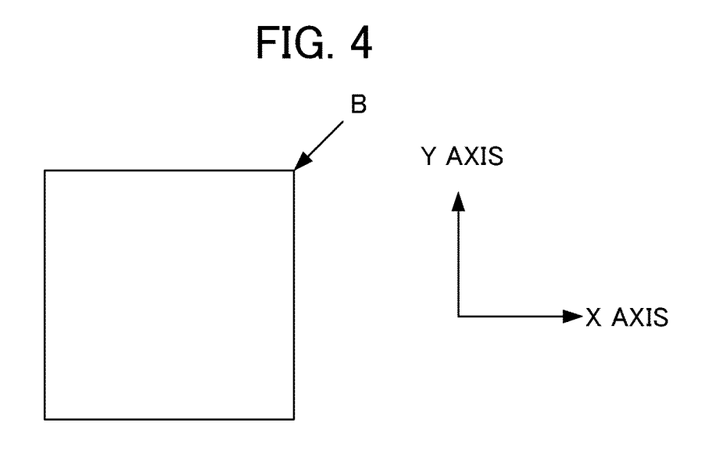
FIG. 4 is an explanation diagram showing an example in which the geometry is formed of a square.

When the geometry is a square, for example, in a corner of B point shown in FIG. 4, the motor 202 that moves the table in the Y axis direction makes a transition from stop to rotation operation, the motor 201 that moves the table in the X axis direction makes a transition from rotation to stop, and the table makes a transition from linear operation of the X axis direction to linear operation of the Y axis direction.

Figure 5:
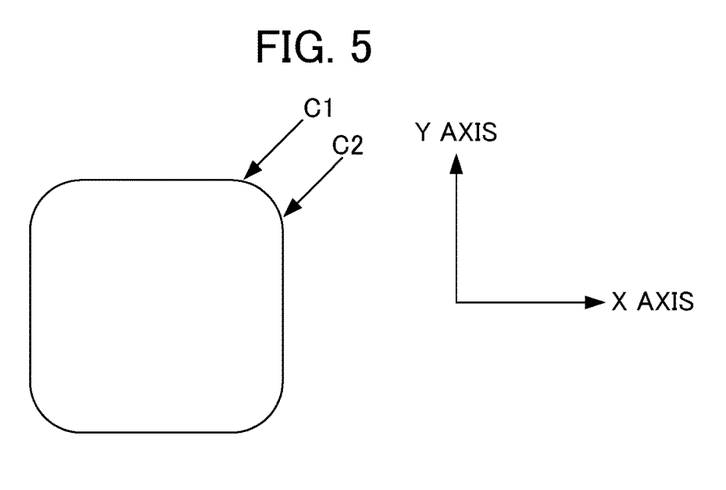
FIG. 5 is an explanation diagram showing an example in which the geometry is formed of a square with corners R.

Even when the geometry is a square with corners R, for example, in C1 point shown in FIG. 5, the motor 202 that moves the table in the Y axis direction makes a transition from stop to rotation operation, and the table makes a transition from linear operation to arc operation of the X axis direction. In a C2 point shown in FIG. 5, the motor 201 that moves the table in the X axis direction makes a transition from rotation to stop operation, and the table makes a transition from arc operation to linear operation of the Y axis direction. As described above, inertial running (inertial operation) occurred when the rotation direction inverts, and a transition is made from the rotation state to stop due to a specified geometry, is evaluated, and influence of the inertial running on the positional deviation is checked.

However, only with these shapes, for example, characteristics of operation in a corner in which both two motors 201, 202 do not invert, operation in a shape in which movement starts in the same direction in stop and after the stop, and operation in a corner in which both two motors 201, 202 invert, cannot be observed. Thus, in the present embodiment, the evaluation program is configured to execute operation including at least the characteristics described above. Thereby, the machine learning device 300 can efficiently perform learning, for example, the adjustment (learning) of the control parameters $a_i$, $b_j$ related to the feedforward, by observing only operation characteristics of the machine tool of when the machine tool is operated by the evaluation program, instead of observing operation characteristics of the machine tool of when the machine tool is operated by all machining programs.

Thus, the geometry by the evaluation program of the present embodiment is, for example, composed of any of an octagon in which some corners are arcs, a cross shape having in an end portion a half shape of the octagon in which some corners are arcs, a cross shape with corners R (a cross shape having arc-shaped corners), a cross shape composed of a convex arc and a concave arc, and a star shape, or combination thereof. The geometry corresponds to a shape of the movement path of the workpiece to be a control target that moves by the X axis and the Y axis driven by the motors 201, 202. Each geometry is described below with reference to FIG. 6 to FIG. 10. Machining in each drawing is assumed to be performed in a clockwise direction. The machining may be performed in a counterclockwise direction instead of a clockwise direction.

Figure 6:
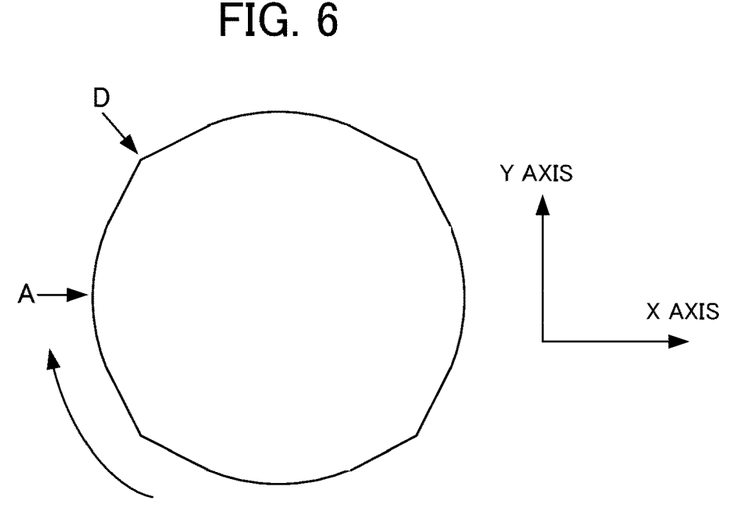
FIG. 6 is an explanation diagram showing a first configuration example in which the geometry is formed of an octagon in which some corners are arcs.

FIG. 6 is an explanation diagram showing a first configuration example in which the geometry is a shape formed of an octagon in which some corners are arcs. The octagon shown in FIG. 6 has arcs in positions in which the motor inverts. Conventionally, adjustment at the time of inversion is performed by setting a geometry to be a circle as shown in FIG. 3. As shown in FIG. 3, in the A point that is a point in a circle, the motor 201 that drives the X axis in an arc inverts. Thus, rotation of the motor 201 decelerates toward the A point, and inverts and accelerates from the A point. On the other hand, in the A point and near the A point, the motor 202 that drives the Y axis rotates at the fastest speed. As a result, the geometry draws an arc. At that time, an error due to delay at the time of inversion of the motor 201 in the X axis affects a long range (a range enclosed by a dot line in FIG. 3) of the Y axis shown in FIG. 3. Accordingly, operation characteristics related to an error of the X axis at the time of inversion can be observed by observing the arc machining shape after and before of the A point. However, only with operation in which the geometry is a circle, there is no point in which speed changes discontinuously.

In the first configuration example, as shown in FIG. 6, D point that is a corner in which both the motors 201, 202 driving the X axis and the Y axis do not invert, is provided. Thereby, in addition to the conventional operation characteristics at the time of inversion in an arc, the D point of acceleration change in which speed changes discontinuously is provided, operation characteristics observed for the adjustment of the control parameters $a_i$, $b_j$ related to the feedforward are added, and the control parameters $a_i$, $b_j$ related to the feedforward are more correctly and efficiently adjusted. In this way, in the geometry by the evaluation program of the present embodiment, a half of a corner of an octagon is an arc shape, and an arc and a corner are alternately arranged. In an arc portion, operation characteristics in which, although the rotation of the motor inverts, the speed does not change discontinuously can be observed. In a corner portion, operation characteristics in which, although the rotation of the motor does not invert, the speed changes discontinuously can be observed.

The operation characteristics related to the error of the X axis is obtained by observing an arc geometry of before and after in the A point obtained by operating the evaluation program. The operation characteristics in the corner in which the speed changes discontinuously are obtained by observing the geometry of before and after in the D point. Thereby, in addition to the adjustment (learning) at the time of inversion in the A point, the adjustment (learning) of when the speed in the D point changes discontinuously can be performed.

Figure 7:
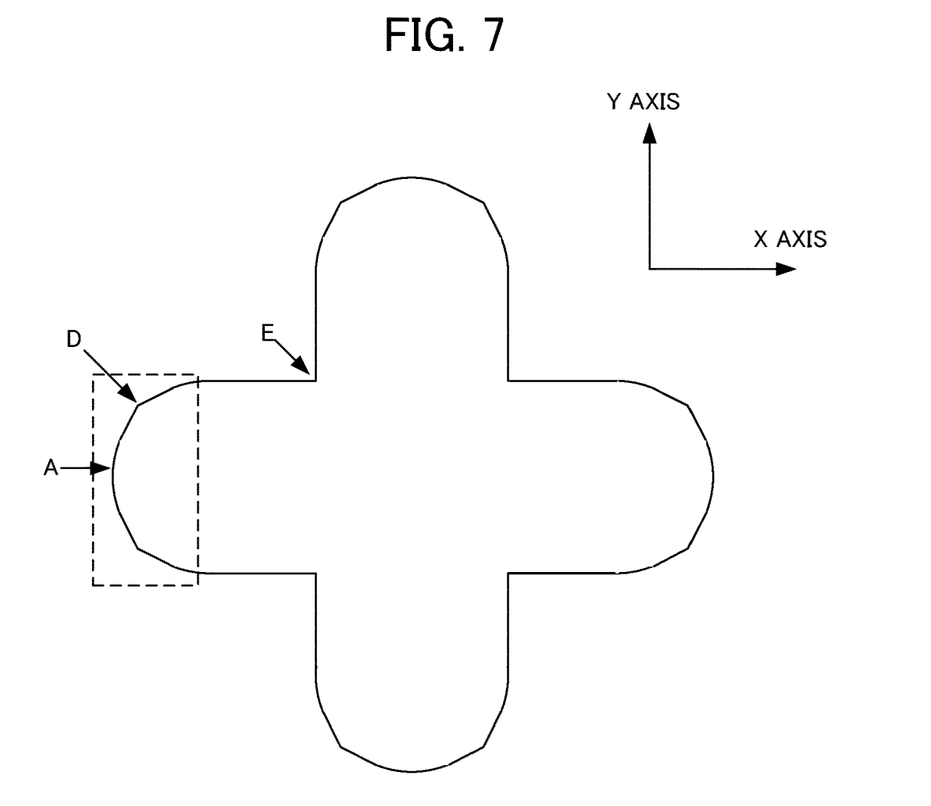
FIG. 7 is an explanation diagram showing a second configuration example in which the geometry is formed of a cross shape having a half shape of the octagon in which some corners are arcs of the first configuration example shown in FIG. 6, in each end portion.

FIG. 7 is an explanation diagram showing a second configuration example in which the geometry is a shape formed of a cross shape having in an end portion a shape that is a half of an octagon in which some corners are arcs, of the first configuration example shown in FIG. 6. That is, a shape of a region enclosed by a dot line shown in FIG. 7 is a shape that is a half of an octagon in which some corners are arcs, of the first configuration example shown in FIG. 6. The A point and the D point of the second configuration example shown in FIG. 7 correspond to the A point and the D point of the first configuration example shown in FIG. 6. In the second configuration example, new E point is provided in addition to the A point and the D point in the first configuration example. In the corner of the E point, the motor 201 that drives the X axis performs operation of stopping from decelerating, while the motor 202 that drives the Y axis performs operation of rotating from the stop state. Thereby, operation characteristics that is observed for the adjustment of the control parameters $a_i$, $b_j$ related to feedforward is added, and the control parameters $a_i$, $b_j$ related to the feedforward are correctly and efficiently adjusted.

Figure 8:
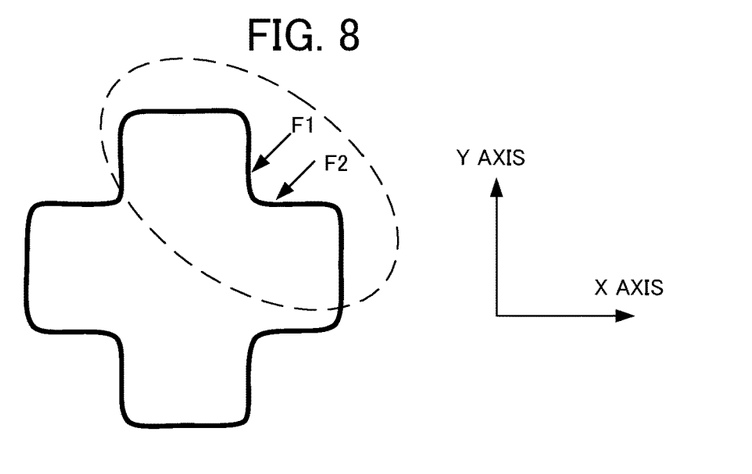
FIG. 8 is an explanation diagram showing a third configuration example in which the geometry is formed of a cross shape with corners R.

FIG. 8 is an explanation diagram showing a third configuration example in which the geometry is a shape formed of a cross shape with corners R. As shown in FIG. 8, in the third configuration example, the geometry is a shape formed of a cross shape including corners formed of convex arcs, and corners formed of concave arcs. As shown in FIG. 5, when the geometry is a square with corners R, for example, when the motor 201 that drives the X axis rotates in the C1 point shown in FIG. 5, the operation characteristics of when the motor 202 that drives the Y axis makes a transition from stop to the rotation operation are evaluated, and when the motor 202 that drives the Y axis rotates in the C2 point, the operation characteristics of when the motor 201 that drives the X axis makes a transition from the rotation operation to stop are evaluated. However, only with the operation in which the geometry is a square with corners R, operation characteristics in a shape in which movement starts in the same direction in stop and before the stop, cannot be evaluated.

In the geometry of the third configuration example shown in FIG. 8, for example, in the region enclosed by a dot line of FIG. 8, the movement direction of from when the Y axis stops to when the Y axis stops next time, and the movement direction of from when the Y axis stops next time are the same, and the movement direction of from when the X axis stops to when the X axis stops next time, and the movement direction of from when the X axis stops next time are the same. Accordingly, the operation characteristics in which both the motors 201, 202 that drive the X axis and the Y axis start rotation in the same direction in stop and before the stop, is evaluated. Thereby, as compared to the geometry that is a square with corners R shown in FIG. 5, for example, operation characteristics of a switching point in which rotation starts in the same direction as that of before the stop in a motor that drives the X axis, such as F1 point, a switching point in which a motor that drives the Y axis stops when the motor that drives the X axis rotates in the same direction as that of before the stop, such as F2 point, can be evaluated. Thereby, the operation characteristics observed for the adjustment of the control parameters $a_i$, $b_j$ related to the feedforward is added, and the control parameters $a_i$, $b_j$ related to the feedforward are correctly and efficiently adjusted.

Figure 9:
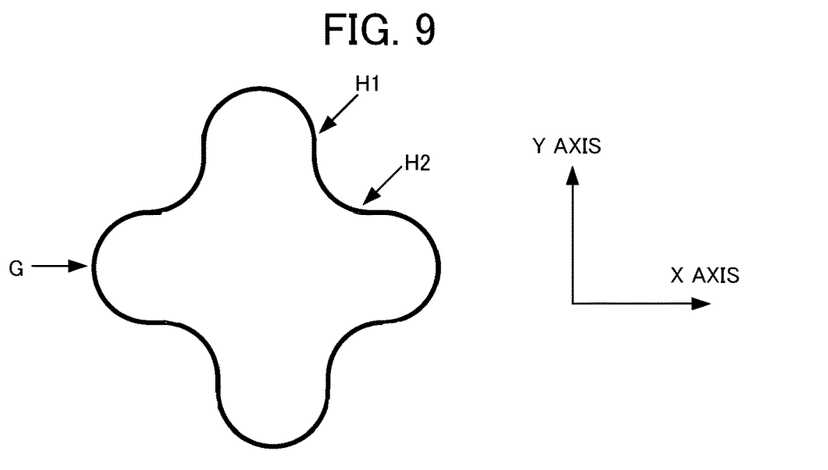
FIG. 9 is an explanation diagram showing a fourth configuration example in which the geometry is formed of a cross shape composed of a convex arc and a concave arc.

FIG. 9 is an explanation diagram showing a fourth configuration example in which the geometry is a shape formed of a cross shape formed of convex arcs and concave arcs. When the geometry is a square with corners R as shown in FIG. 5, the adjustment at the time of inversion performed by setting the geometry to be a circle as shown in FIG. 3 cannot be performed. In addition, the operation characteristics of when the motor starts rotating in the same direction immediately after the rotation of the motor stops cannot be evaluated. The geometry of the fourth configuration example shown in FIG. 9 is a shape of combination of the convex arcs and the concave arcs. As similar to the geometry shown in FIG. 8, the movement direction of from when the Y axis stops to when the Y axis stops next time, and the movement direction of from when the Y axis stops next time are the same, and the movement direction of from when the X axis stops to when the X axis stops next time, and the movement direction of from when the X axis stops next time are the same. However, as compared to the geometry shown in FIG. 8, in the geometry shown in FIG. 9, linear movement is not performed, and arc movement is performed.

Thereby, in G point of FIG. 9, as similar to the A point shown in FIG. 3, rotation of the motor 201 that drives the X axis in the G point inverts, and the operation characteristics at the time of inversion can be evaluated. In H1 point, the operation characteristics of when the motor 201 that drives the X axis starts rotating in the same direction immediately after the rotation of the motor 201 stops are evaluated. In H2 point, the operation characteristics of when the motor 202 that drives the Y axis starts rotating in the same direction immediately after the rotation of the motor 202 stops are evaluated.

Thereby, the operation characteristics at the time of inversion of the rotation of the motor of the X axis (or the Y axis) and the operation characteristics of when the movement direction of from when the X axis (or the Y axis) stops to when the X axis (or the Y axis) stops next time, and the movement direction of when the X axis (or the Y axis) stops next time are the same direction is obtained by observing the geometry of before and after in the G point, the geometry of before and after in the H1 point, and the geometry of before and after in the H2 point. Thereby, the operation characteristics observed for the adjustment of the control parameters $a_i$, $b_j$ related to the feedforward is added, and the control parameters $a_i$, $b_j$ related to the feedforward are correctly and efficiently adjusted.

Figure 10:
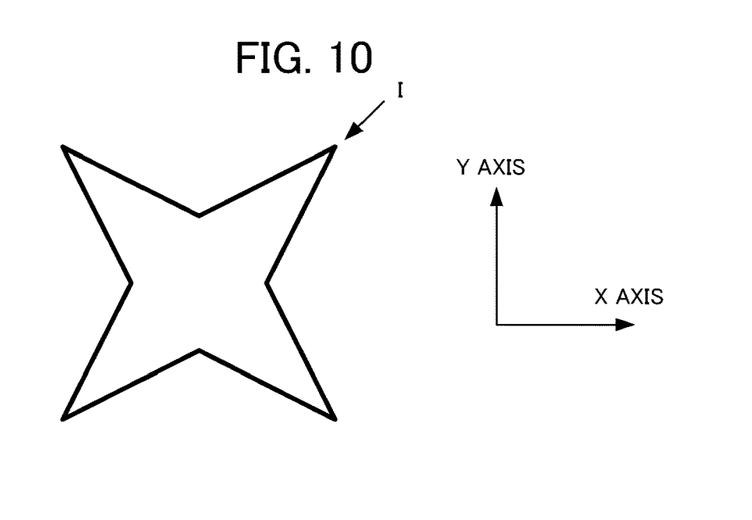
FIG. 10 is an explanation diagram showing a fifth configuration example in which the geometry is formed of a star shape.

FIG. 10 is an explanation diagram showing a fifth configuration example in which the geometry is a shape formed of a star shape. In the geometry of the fifth configuration example shown in FIG. 10, for example, in I point, both rotation directions of the motor 201 that drives the X axis and the motor 202 that drives the Y axis invert. Thereby, the geometry of before and after in the I point is observed. Thus, the operation characteristics of when both rotation directions of the motor 201 that drives the X axis and the motor 202 that drives the Y axis invert is obtained. Thereby, the operation characteristics observed for the adjustment of the control parameters $a_i$, $b_j$ related to the feedforward is added, and the control parameters $a_i$, $b_j$ related to the feedforward are correctly and efficiently adjusted.

The geometry based on the evaluation program used in the present embodiment is described above. The operation characteristics may be evaluated by combining the geometry by the evaluation program used in the present embodiment, and at least one geometry of an arc (circle), a square, a square with corners R, and an octagon. As described with reference to FIG. 3, the arc can be used for detecting the characteristics at the time of inversion of the motor that drives the other axis, of when the motor that drives one axis rotates in one direction. As described with reference to FIG. 4, the corner of the square can be used for detecting the characteristics of when the motor that drives one axis stops from decelerating, and the motor that drives the other axis accelerates from the stop. The square with corners R described with reference to FIG. 5 can be used for detecting the characteristics of when a transition is made from a line to an arc, and an arc to a line, that is, the characteristics of when the motor that drives the one axis decelerates for the stop, when the motor that drives the other axis accelerates from the stop. The octagon is a shape in which the shape of a portion corresponding to a corner is changed from an arc to a corner, in the first configuration example shown in FIG. 6, and is configured so that, in the A point of the first configuration example shown in FIG. 6, the speed changes discontinuously.

It has been described that the evaluation program is stored in the storage unit 101. However, the storage is not limited to this. The evaluation program may be stored by using various types of non-transitory computer readable media, and supplied to the computer. The non-transitory computer readable media include various types of tangible storage media. Examples of the non-transitory computer readable media include a magnetic recording medium (for example, a flexible disk, and a hard disk drive), a magneto-optical recording medium (for example, a magneto-optical disk), a CD-ROM (read only memory), a CD-R, a CD-R/W, a semiconductor memory (for example, a mask ROM, a programmable ROM (PROM), an erasable PROM (EPROM), a flash ROM, and a random access memory (RAM).

In the present embodiment, a machine learning in which the operation characteristics of the machine tool of when the machine tool is operated by the evaluation program is observed, and thereby, the adjustment (learning) of the control parameters $a_i$, $b_j$ related to the feedforward can be efficiently performed, is exemplified. However, application of the evaluation program is not limited to the adjustment (learning) of the control parameters $a_i$, $b_j$ related to the feedforward. For example, the evaluation program can be applied to the adjustment (learning) of the control parameters related to static friction, and the control parameters related to backlash at the time of inversion. The machine learning device 300 described above observes the positional deviation as the operation characteristic by causing the CNC device 100 to execute the evaluation program. However, the feedback information is not limited to the positional deviation, and may include at least one of the position command and the position feedback (position detection value) in addition to the positional deviation.

In addition, at least one of a velocity command, velocity feedback, velocity deviation, a current command, a current feedback, and current deviation may be added as an operation command. An output of the numerical control information processing unit 102 corresponds to the position command, and an output of the integrator 1007 corresponds to the position feedback. An output of the adder 1003 corresponds to the velocity command, an output of the rotary encoder associated with the motor corresponds to the velocity feedback (velocity detection value), and an output of the subtractor 1004 corresponds to the velocity deviation. An output of the adder 1006 corresponds to the current command, a detection value of a current flown in the motor corresponds to the current feedback, and an output of the subtractor 1010 corresponds to the current deviation.

Figure 11:
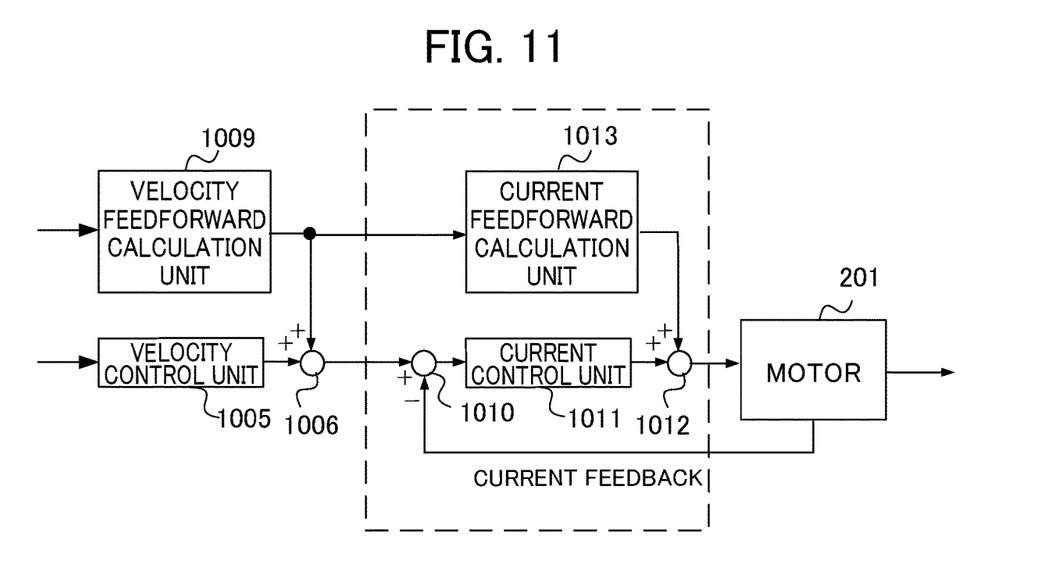
FIG. 11 is a block diagram showing part of configuration of another configuration example of the CNC device.

The adjustment of the feedforward is not limited to the adjustment (learning) in the velocity feedforward calculation unit 1009. For example, the adjustment (learning) may be performed with respect to the coefficients (control parameters) of the transfer function of the position feedforward calculation unit 1008 and/or the current feedforward calculation unit 1013, in addition to the velocity feedforward calculation unit 1009, or instead of the velocity feedforward calculation unit 1009. For example, FIG. 11 is a block diagram showing a configuration of part of another configuration example of the CNC device. FIG. 11 shows a CNC device that is obtained by further adding a subtractor 1010, a current control unit 1011, an adder 1012, and a current feedforward calculation unit 1013 to the CNC device shown in FIG. 8. The control parameters $a_i$, $b_j$ may be adjusted not by machine learning, but by appropriately inputting the control parameters $a_i$, $b_j$ by, for example, an operator via a control display panel or the like, to operate the evaluation program, and observing the operation characteristics.

The adjustment (learning) of the control parameters related to backlash compensation and/or backlash acceleration compensation may be performed (instead of the adjustment (learning) of the control parameters $a_i$, $b_j$ related to the feedforward) by observing the operation characteristics of the machine tool of when the machine tool is operated by the evaluation program. For the adjustment of the control parameters, for example, observation of the operation characteristics at the time of inversion in the A point in the first configuration example shown in FIG. 6 and the second configuration example shown in FIG. 7, and the operation characteristics at the time of inversion in the I point in the fifth configuration example shown in FIG. 10, is particularly effective.

The adjustment (learning) of the control parameters related to the static friction compensation may be performed (instead of the adjustment (learning) of the control parameters $a_i$, $b_j$ related to the feedforward), by observing the operation characteristics of the machine tool of when the machine tool is operated by the evaluation program. For the adjustment of the control parameters, for example, observation of the operation characteristics in the C point of the second configuration example shown in FIG. 4 is particularly effective.

<Supplementary Explanation>

Figure 12:
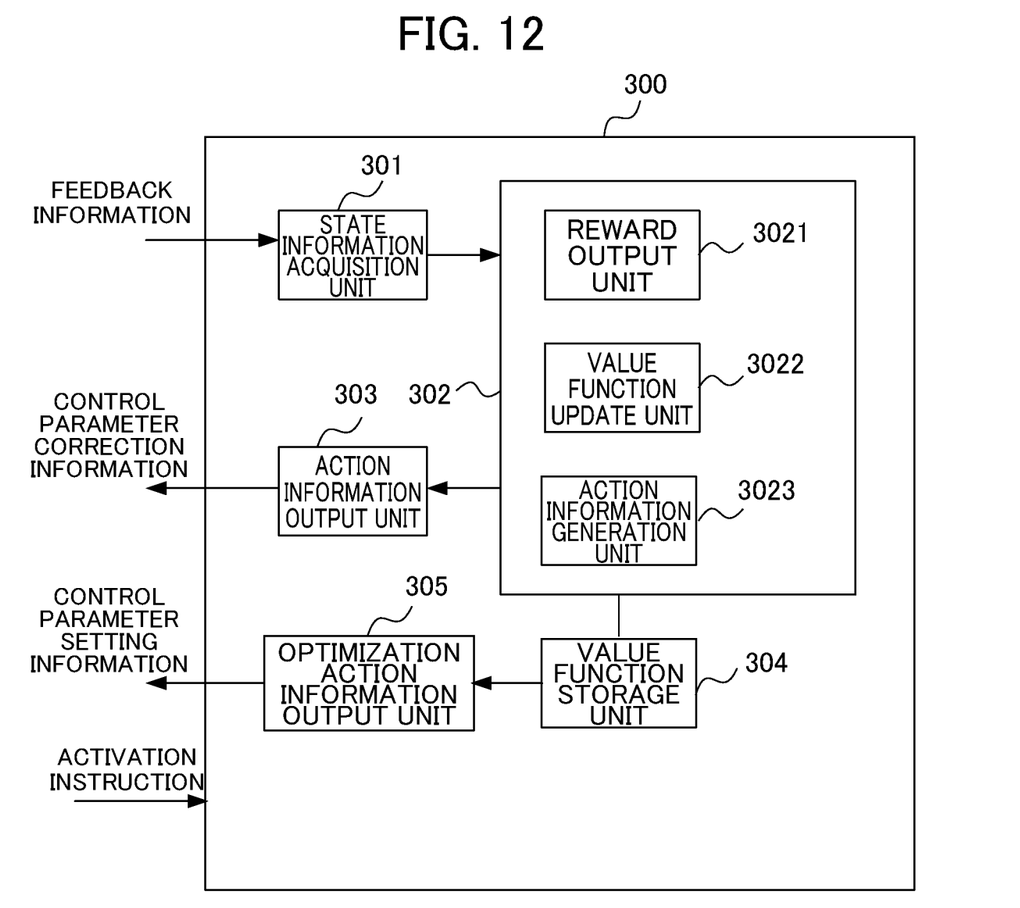
FIG. 12 is a block diagram showing a machine learning device of a first embodiment.

Finally, the machine learning in the present embodiment will be briefly described as supplementary explanation. FIG. 12 is a block diagram showing the machine learning device 300 of the first embodiment of the present invention. In order to perform the reinforcement learning described above, as shown in FIG. 12, the machine learning device 300 includes a state information acquisition unit 301, a learning unit 302, an action information output unit 303, a value function storage unit 304, and an optimization action information output unit 305. The learning unit 302 includes a reward output unit 3021, a value function update unit 3022, and an action information generation unit 3023.

<Agent>

An agent (corresponding to the machine learning device 300 in the present embodiment) observes an environmental state, selects an action, changes environment on the basis of the action, is given any reward in accordance with the environmental change, and learns selection (decision making) of better action.

<State s>

The servo state such as the command, the feedback, and the like, including values of the coefficients $a_i$, $b_j$ (i, j≥0) of the transfer function G(s) of the velocity feedforward calculation unit 1009 in the CNC device 100, and the positional deviation information of the CNC device 100 acquired by executing the evaluation program at the time of learning, is referred to as state $s_c$. The state information acquisition unit 301 acquires the state $s_c$.

<Action $a_c$>

The adjustment of the control parameters $a_i$, $b_j$ of the velocity feedforward calculation unit 1009 related to the state $s_c$ (for example, random and slight correction of the control parameters $a_i$, $b_j$) is referred to as an action $a_c$. For example, the control parameters $a_i$, $b_j$ are $a_0=1$, $a_1=0$, $b_0=0$, $b_1$=(an inertia value of a control target) of the [formula 1], as initial set values. The dimensions m, n of the coefficients $a_i$, $b_j$ are set in advance. The action information generation unit 3023 in the learning unit 302 generates the action $a_c$, and the action information output unit 303 outputs the action $a_c$ in the state $s_c$ to the CNC device 100.

<Reward r>

A set (positional deviation set) of the positional deviation that is a state variable in the state $s_c$ is indicated by $PD(s_c)$, and a positional deviation set that is a state variable related to the state information $s_c'$ that has been changed from the state $s_c$ by the action information $a_c$ is indicated by $PD(s_c')$. The value of the positional deviation in the state $s_c$ is set to be a value calculated on the basis of an evaluation function $f(PD(s_c))$ set in advance. The action information $a_c$ is correction information of the coefficients $a_i$, $b_j$ (i, j indicates 0 and positive integers) of the velocity feedforward calculation unit. For example, as the evaluation function f, a function of calculating an integrated value of an absolute value of positional deviation
$\int |e| dt$
a function of calculating an integrated value by weighting the absolute value of the positional deviation with time
$\int t|e|dt$
a function of calculating an integrated value of 2n-th (n is a natural number) power of the absolute value of the positional deviation
$\int e^{2n} dt$ (n is a natural number)
a function of calculating the maximum value of the absolute value of the positional deviation
$Max\{|e|\}$
and the like can be applied.

At this time, when the value $f(PD(s_c'))$ of the positional deviation of the CNC device 100 operated on the basis of the velocity feedforward calculation unit 1009 after the correction related to the state information $s_c'$ corrected by the action information $a_c$, is larger than the value $f(PD(s_c))$ of the positional deviation of the CNC device 100 operated on the basis of the velocity feedforward calculation unit 1009 before the correction related to the state information $s_c$ of before the correction by the action information $a_c$, the value of the reward r is set to be a negative value.

On the other hand, when the value $f(PD(s_c'))$ of the positional deviation of the CNC device 100 operated on the basis of the velocity feedforward calculation unit 1009 after the correction related to the state information $s_c'$ corrected by the action information $a_c$, is smaller than the value $f(PD(s_c))$ of the positional deviation of the CNC device 100 operated on the basis of the velocity feedforward calculation unit 1009 of before the correction related to the state information $s_c$ of before the correction by the action information $a_c$, the value of the reward r is set to be a positive value. When the value $f(PD(s_c'))$ of the positional deviation of the CNC device 100 operated on the basis of the velocity feedforward calculation unit 1009 after the correction related to the state information $s_c'$ corrected by the action information $a_c$, is equal to the value $f(PD(s_c))$ of the positional deviation of the CNC device 100 operated on the basis of the velocity feedforward calculation unit 1009 before the correction related to the state information $s_c$ of before the correction by the action information $a_c$, the value of the reward r is set to be zero. The reward output unit 3021 in the learning unit 302 calculates the reward r of when the action $a_c$ is applied to the state $s_c$.

<Value Function Q>

In an environmental state $s_c$, a value of when the action $a_c$ is selected is indicated by $Q(s_c, a_c)$. In this way, $Q(s_c, a_c)$ is a function in which the state $s_c$ and the action $a_c$ are inputs. At the time when the learning starts for the first time, in regard to combination of the state $s_c$ and the action $a_c$, correct values of the value $Q(s_c, a_c)$ are completely not known. Then, the agent selects various actions $a_c$ in a state $s_c$, and selects better action on the basis of a reward given with respect to the action $a_c$ at that time, to learn a correct value $Q(s_c, a_c)$. An update formula of the value $Q(s_c, a_c)$ as described above, for example, can be represented by following formula 2 (shown as Math. 2 below).

$$Q(s_{t+1}, a_{t+1}) \leftarrow Q(s_t, a_t) + \alpha \left( r_{t+1} + \gamma \max_a Q(s_{t+1}, a) - Q(s_t, a_t) \right) \quad \text{[Math. 2]}$$

In the formula 2 described above, $s_{ct}$ represents an environmental state at time t, and $a_{ct}$ represents an action at the time t. The state is changed to $s_{ct+1}$ by the action $a_{ct}$. $r_{t+1}$ represents a reward acquired by the state change. An article with max is obtained by multiplying γ to a Q value of when an action a having the highest Q value that is known at that time in the state $s_{ct+1}$, is selected.

γ is a parameter of 0<γ≤1, and is referred to as a discount rate.

α is a learning coefficient, and is within a range of 0<α≤1. As learning, there is a method of creating a table of the $Q(s_c, a_c)$ for all state action pairs $(s_c, a_c)$ to perform learning. The value function update unit 3022 in the learning unit 302 updates the value function Q stored by the value function storage unit 304 by performing learning on the basis of the state $s_c$, the action $a_c$, the state $s_c'$ of when the action $a_c$ is applied to the state $s_c$, and the value of the reward r calculated by the reward output unit 3021.

As described above, an action $a_c$ with which the value of the $Q(s_c, a_c)$ is the maximum is selected from among actions $a_c$ applied to the coefficients $a_i$, $b_j$ of the transfer function of the velocity feedforward calculation unit 1009 related to a state $s_c$ on the basis of the value function Q learned by the machine learning device 300. Thereby, the action $a_c$ (that is, the coefficients $a_i$, $b_j$ of the velocity feedforward calculation unit 1009) with which the positional deviation acquired by executing the evaluation program is the minimum can be selected. The optimization action information output unit 305 generates the action information $a_c$ (hereinafter, referred to as "optimizing action information") for causing the velocity feedforward calculation unit 1009 to perform operation in which the value $Q(s_c, a_c)$ is the maximum, on the basis of the value function Q updated by performing learning by the value function update unit 3022. The machine learning in the present embodiment has been supplementary explained above. However, the machine learning described here is an example for the adjustment (learning) by observing the evaluation by the evaluation program, and the adjustment (learning) is not limited thereto. For example, an operator uses the evaluation program to adjust the control parameters.

In the embodiment, the CNC device 100 and the machine learning device 300 have been described above. In order to realize these functions, each of the CNC device 100 and the machine learning device 300 includes an operation processing device such as a central processing unit (CPU). Each of the CNC device 100, the machine learning device 300, and the adjustment device 500 includes an auxiliary storage device such as a hard disk drive (HDD) in which application software, and various control programs such as an operating system (OS) are stored, and a main storage device such as a random access memory (RAM) for storing data temporarily needed for executing the program by the operation processing device.

Each of the CNC device 100 and the machine learning device 300 read the application software or the OS from the auxiliary storage device by the operation processing device, and performs operation processing based on the application software or the OS while decompressing the read application software or the OS into the main storage device. The CNC device 100 and the machine learning device 300 control various hardware included by each device, on the basis of the operation result. Thereby, the function blocks of the present embodiment are realized. That is, the present embodiment can be realized by cooperation of hardware and software.

The machine learning device 300 has a lot of operation amounts associated with machine learning. Thus, it is preferable that, for example, a personal computer is mounted with graphics processing units (GPUs), and the GPUs are utilized for the operation processing associated with the machine learning by a technique called general-purpose computing on graphics processing units (GPGPU), so that the machine learning device 300 can perform high speed processing. Further, in order to perform higher speed processing, a plurality of such computers mounted with the GPUs may be used to construct a computer cluster, so that parallel processing is performed by the plurality of computers included in the computer cluster.

In the present embodiment, the CNC device 100, and each of components included in the machine learning device 300 can be realized by hardware, software or combination thereof. The servo control method performed by cooperation of each of the components included in the motor control unit serving as the servo control device described above, also can be realized by hardware, software, or combination thereof. Being realized by software means being realized by reading and executing a program by a computer.

Although the embodiment described above is a preferable embodiment of the present invention, the scope of the present invention is not limited thereto. The present invention may be performed in an embodiment in which various modifications are performed without departing from the scope of the present invention.

EXPLANATION OF REFERENCE NUMERALS

100 Computerized numerical control (CNC) device
101 Storage unit
102 Numerical control information processing unit
103, 104 Motor control unit
201, 202 Motor
300 Machine learning device

What is claimed is:

1. A non-transitory computer readable information recording medium storing an evaluation program for operating first and second motor control units, for evaluating operation characteristics related to a control device including the first motor control unit for controlling a first motor driving a first axis of a machine tool, a robot, or an industrial machine, and the second motor control unit for controlling a second motor driving a second axis of a different direction from the first axis, the evaluation program causing a computer to execute processing of operating the first and second motor control units so that a shape of a movement path of a control target moved by the first and second axes driven by the first and second motors includes at least a cornered shape in which both rotation directions of the first and second motors do not invert, and an arc shape in which one of the first and second motors rotates in one direction, and a rotation direction of the other of the first and second motors inverts; and the shape of the movement path is an octagon in which the cornered shape and the arc shape are alternately arranged.

2. A non-transitory computer readable information recording medium storing an evaluation program for operating first and second motor control units, for evaluating operation characteristics related to a control device including the first motor control unit for controlling a first motor driving a first axis of a machine tool, a robot, or an industrial machine, and the second motor control unit for controlling a second motor driving a second axis of a different direction from the first axis, the evaluation program causing a computer to execute processing of operating the first and second motor control units so that a shape of a movement path of a control target moved by the first and second axes driven by the first and second motors includes at least a cornered shape in which both rotation directions of the first and second motors do not invert, and an arc shape in which one of the first and second motors rotates in one direction, and a rotation direction of the other of the first and second motors inverts; the shape of the movement path includes a cornered shape in which one of the first and second motors decelerates and then stops, and the other of the first and second motors rotates from a stop state; and the shape of the movement path is a cross shape having a half of an octagon in which the cornered shape and the arc shape are alternately arranged, in an end portion.

* * * * *